(12) United States Patent
Kaiserwerth et al.

(10) Patent No.: US 7,730,093 B2
(45) Date of Patent: Jun. 1, 2010

(54) METHOD FOR CONTROLLING ACCESS TO THE RESOURCES OF A DATA PROCESSING SYSTEM, DATA PROCESSING SYSTEM, AND COMPUTER PROGRAM

(75) Inventors: Rudolf Kaiserwerth, Mering (DE); Hermann Josef Wagner, Germering (DE); Rudolf Wildgruber, Munich (DE); Harald Kopper, Inning (DE); Rupert Weidinger, Forstern (DE); Rudolf Woehrl, Garching (DE)

(73) Assignee: Siemens Aktiengesellschaft, Munich (DE)

( * ) Notice: Subject to any disclaimer, the term of this patent is extended or adjusted under 35 U.S.C. 154(b) by 809 days.

(21) Appl. No.: 10/255,078

(22) Filed: Sep. 26, 2002

(65) Prior Publication Data
US 2003/0078932 A1 Apr. 24, 2003

(30) Foreign Application Priority Data
Sep. 26, 2001 (DE) ................. 101 47 465

(51) Int. Cl.
G06F 7/00 (2006.01)
G06F 17/30 (2006.01)
(52) U.S. Cl. ..................................................... 707/784
(58) Field of Classification Search .......... 707/1–104.1; 705/35–37, 42; 709/229
See application file for complete search history.

(56) References Cited

U.S. PATENT DOCUMENTS

| | | | | |
|---|---|---|---|---|
| 5,832,506 A * | 11/1998 | Kuzma | ........................ | 707/200 |
| 5,911,143 A * | 6/1999 | Deinhart et al. | ......... | 707/103 R |
| 5,920,856 A * | 7/1999 | Syeda-Mahmood | ............ | 707/3 |
| 6,055,637 A | 4/2000 | Hudson et al. | .............. | 713/201 |
| 6,067,548 A * | 5/2000 | Cheng | ..................... | 707/103 R |
| 6,119,104 A * | 9/2000 | Brumbelow et al. | .......... | 705/35 |
| 6,161,139 A * | 12/2000 | Win et al. | .................... | 709/225 |
| 6,182,142 B1 * | 1/2001 | Win et al. | .................... | 709/229 |
| 6,269,405 B1 * | 7/2001 | Dutcher et al. | .............. | 709/248 |
| 6,292,838 B1 * | 9/2001 | Nelson | ........................ | 709/236 |
| 6,343,287 B1 * | 1/2002 | Kumar et al. | .................. | 707/4 |
| 6,470,332 B1 * | 10/2002 | Weschler | ........................ | 707/3 |
| 6,484,177 B1 * | 11/2002 | Van Huben et al. | ........... | 707/10 |

(Continued)

FOREIGN PATENT DOCUMENTS

DE 19954358 7/2000

(Continued)

OTHER PUBLICATIONS

William F. Nunes. Meta Directory Services (MDS). Achieving Identity Managment through MDS, white paper. Leading Edge forum. CSC. Mar. 30, 2001.*

(Continued)

*Primary Examiner*—John E Breene
*Assistant Examiner*—Aleksandr Kerzhner
(74) *Attorney, Agent, or Firm*—Staas & Halsey LLP

(57) ABSTRACT

In a data processing system with at least one data processing device, a large number of databases allocated to the data processing system and having user-specific data are linked together for forming a single resulting user database. Access permissions for resources provided by the at least one data processing device are awarded by predefined user roles. At least one user role is allocated to at least one user of the data processing system.

15 Claims, 3 Drawing Sheets

U.S. PATENT DOCUMENTS

| | | | | |
|---|---|---|---|---|
| 6,643,661 | B2* | 11/2003 | Polizzi et al. | 707/100 |
| 6,671,695 | B2* | 12/2003 | McFadden | 707/102 |
| 6,697,865 | B1* | 2/2004 | Howard et al. | 709/229 |
| 6,718,335 | B1* | 4/2004 | Ball | 707/102 |
| 6,768,988 | B2* | 7/2004 | Boreham et al. | 707/3 |
| 6,859,217 | B2* | 2/2005 | Robertson et al. | 715/853 |
| 6,871,231 | B2* | 3/2005 | Morris | 709/225 |
| 6,871,232 | B2* | 3/2005 | Curie et al. | 709/225 |
| 6,985,955 | B2* | 1/2006 | Gullotta et al. | 709/229 |
| 6,990,492 | B2* | 1/2006 | Gupta | 707/9 |
| 6,990,513 | B2* | 1/2006 | Belfiore et al. | 709/203 |
| 7,031,967 | B2* | 4/2006 | Cheng et al. | 707/10 |
| 7,062,563 | B1* | 6/2006 | Lewis et al. | 709/227 |
| 7,131,000 | B2* | 10/2006 | Bradee | 713/164 |
| 2002/0032687 | A1* | 3/2002 | Huff | 707/104.1 |
| 2002/0049907 | A1* | 4/2002 | Woods et al. | 713/182 |
| 2002/0091801 | A1* | 7/2002 | Lewin et al. | 709/219 |
| 2002/0103811 | A1* | 8/2002 | Fankhauser et al. | 707/104.1 |
| 2002/0133723 | A1* | 9/2002 | Tait | 713/201 |
| 2002/0162020 | A1* | 10/2002 | Bellaton et al. | 713/201 |
| 2002/0184230 | A1* | 12/2002 | Merrells et al. | 707/102 |
| 2003/0037044 | A1* | 2/2003 | Boreham et al. | 707/3 |
| 2003/0135507 | A1* | 7/2003 | Hind et al. | 707/100 |
| 2004/0078373 | A1* | 4/2004 | Ghoneimy et al. | 707/10 |

FOREIGN PATENT DOCUMENTS

| | | |
|---|---|---|
| EP | 1339002 A1 * | 2/2001 |
| WO | WO01/41039 A2 | 6/2001 |

OTHER PUBLICATIONS

Cathleen Moore. Catalyst Conference Spotlights role of directory. Infoworld.com article. Jul. 25, 2001.*

M. Hitchens and V. Varadharajan. Design and Specification of Role Based Access control policies. IEEE proceedings online Aug. 2000.*

Gartner Group conference Presentation. Active Directory. 2000.*

An Introduction to Role-Based Access Control. Web published Paper 1995.*

Juliana Freire et al. MetaComm: a meta-directory for telecommunications. Data Engineering Proceedings. 16Th International Conference Feb. 29-Mar. 3, 2000. IEEE website.*

Joon S. Park et al. Role-Based Access Control on the Web. ACM Feb. 2001.*

Joon S. Park et al. Role-Based Access Control on the Web. ACM Pub. Feb. 2001.*

Anne C. Lear. Trends. The Directory-Enabled Enterprise. Pub. In IT Pro Jul./Aug. 1999.*

Joon S. Park et al. Role-Based Access Control on The Web using LDAP. Proceedings of the fifteenth annual working conference on Database and application security. Jul. 15-18, 2001.*

L. Bartz. LDAP Schema for Role Based Access Control. Network working group. Internet draft. Oct. 21, 1997.*

Haio Roeckle et al. Process-Oriented Approach for Role-Finding to Implement Role-Based Security Administration in a Large Industrial Organization. Jul. 26-28, 2000.*

Datga Warehousing: Bringing it All together. John Van Den Hoven. Database Mgmt. Article. Spring 1998.*

Kang et al., "Access Control Mechanisms for Inter-organizational Workflow", Proceedings of the 6th ACM Symposium on Access Control Models and Technologies, May 2001, pp. 1-9.

Siemens, "Meta Directory", Internet Publication, Feb. 17, 2001, URL:http://web.archive.org/web/20010217060834/www.ic.siemens.com/CDA/Site/pss_GG/1, 1294,208470-1-999,00.html, pp. 1-3.

* cited by examiner

METHOD FOR CONTROLLING ACCESS TO THE RESOURCES OF A DATA PROCESSING SYSTEM, DATA PROCESSING SYSTEM, AND COMPUTER PROGRAM

CROSS REFERENCE TO RELATED APPLICATIONS

This application is based on and hereby claims priority to German Application No. 101 47 465.2 filed on Sep. 26, 2001, the contents of which are hereby incorporated by reference.

BACKGROUND OF THE INVENTION

Market- and customer-oriented organizations change many times faster than the data processing systems which the organization uses to image its business processes. Special requirements arise from this in regard to the control of access to resources of data processing systems in organization units which are rapidly changing.

From DE 199 54 358 A1, a method is known for the control of user access in a network environment, using user roles. A user role determines the function of a user within an organization unit and serves to define of the scope of his operating responsibility.

A user role access control includes one or more user roles and access permissions, by which it is determined whether actions can be performed on computer-based objects. The user role access control is used to approve a user's request if user access roles grant access permissions which permit him to perform specific actions on a computer-based object.

One potential object of the present invention is to provide a method, a data processing system and a computer program for the efficient control of access to resources of a data processing system with different kinds of data processing devices, with different kinds of program applications which are provided by the data processing devices, and with frequent user data changes.

SUMMARY OF THE INVENTION

An important aspect relates to user-specific data being made accessible, in an integrated structure in a resulting user database, for substantially all the data processing devices of a data processing system. The resulting user database arises from the combination of a large number of databases with user-specific data. User roles, as the basis of a role-based resource access control, are also counted among the user-specific data. The data processing devices of the data processing system are target systems for the resource access control. In particular, a prerequisite is created for role-based resource access control in data processing systems with heterogeneous target systems and user-specific data recorded in a distributed manner.

Moreover, a use of role-based access control mechanisms in a resulting user database, also known as a meta-catalog, means a violation of a paradigm of the conventional meta-catalog technology. Namely, no n:m relationships are provided in the data model in conventional meta-catalog technology. These n:m relationships are however necessary for a role-based access control because of an allocation of users to roles, an allocation of roles to access permissions, and an allocation of access permissions to resources.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
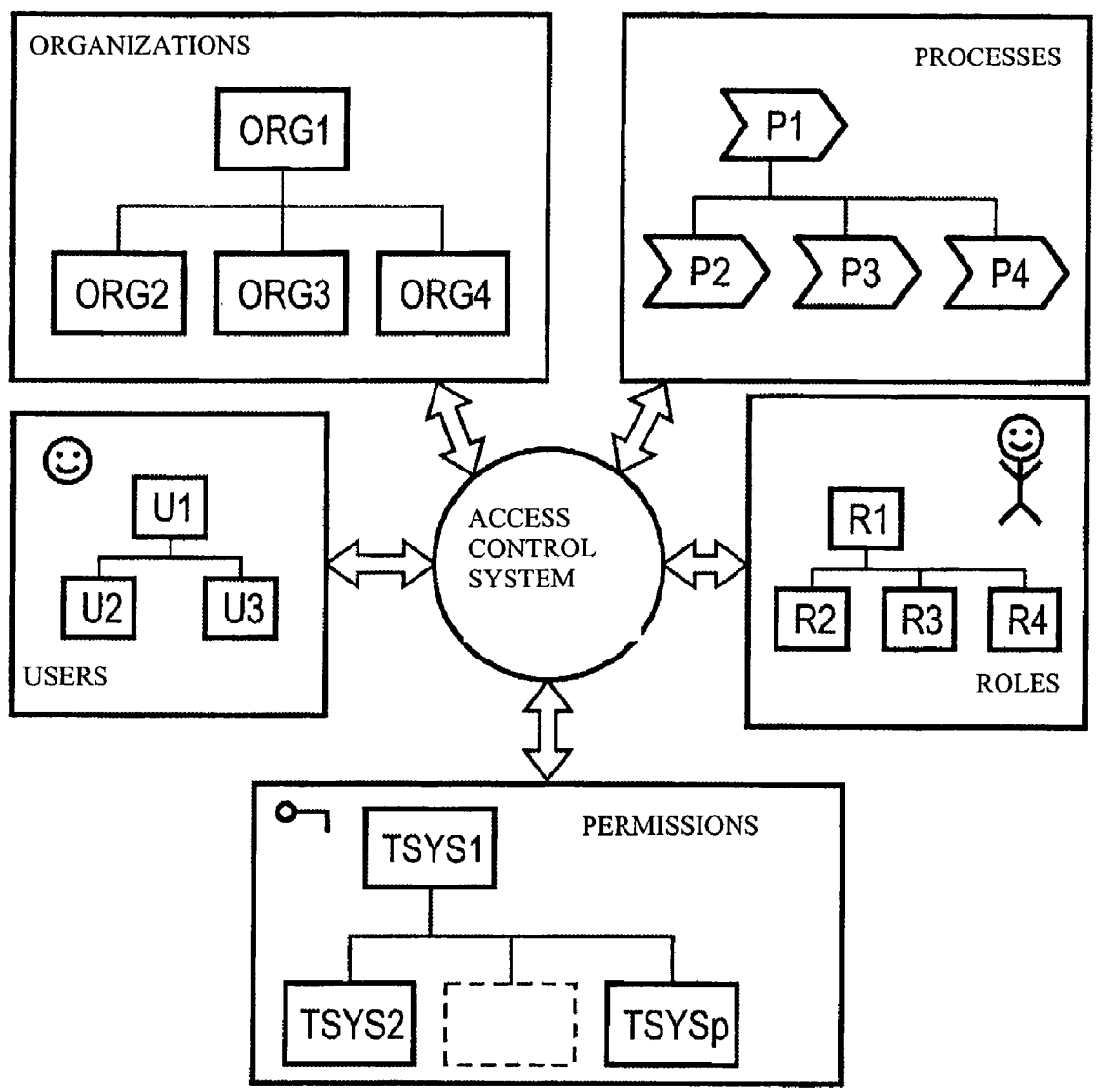
FIG. 1 shows a schematic diagram of the mode of operation of a role-based resource access control system.

Reference will now be made in detail to the preferred embodiments of the present invention, examples of which are illustrated in the accompanying drawings, wherein like reference numerals refer to like elements throughout.

FIG. 1 shows the environment in which a role-based resource access control system is embedded. Roles R1-R4 can be defined or derived using the membership of users U1-U3 in organization units ORG1-ORG4 and also their responsibility regions for business processes P1-P4. Access permissions to resources of an organization-wide data processing system with numerous data processing devices TSYS1-TSYSp are controlled by the defined or derived roles R1-R4. The data processing devices TSYS1-TSYSp here form target systems for the role-based resource access control. Within the scope of the role-based resource access control, users U1-U3 are allocated to roles R1-R4, roles R1-R4 to permissions, and permissions to resources of target systems TSYS1-TSYSp. The roles R1-R4 therewith represent a bundle of access permissions. Further details of role-based resource access control systems are described in David Ferraiolo, Richard Kuhn: "Role Based Access Control", Proceedings of the 15th National Computer Security Conference, 1992, Vol. 11, pp. 554-563.

Figure 2:
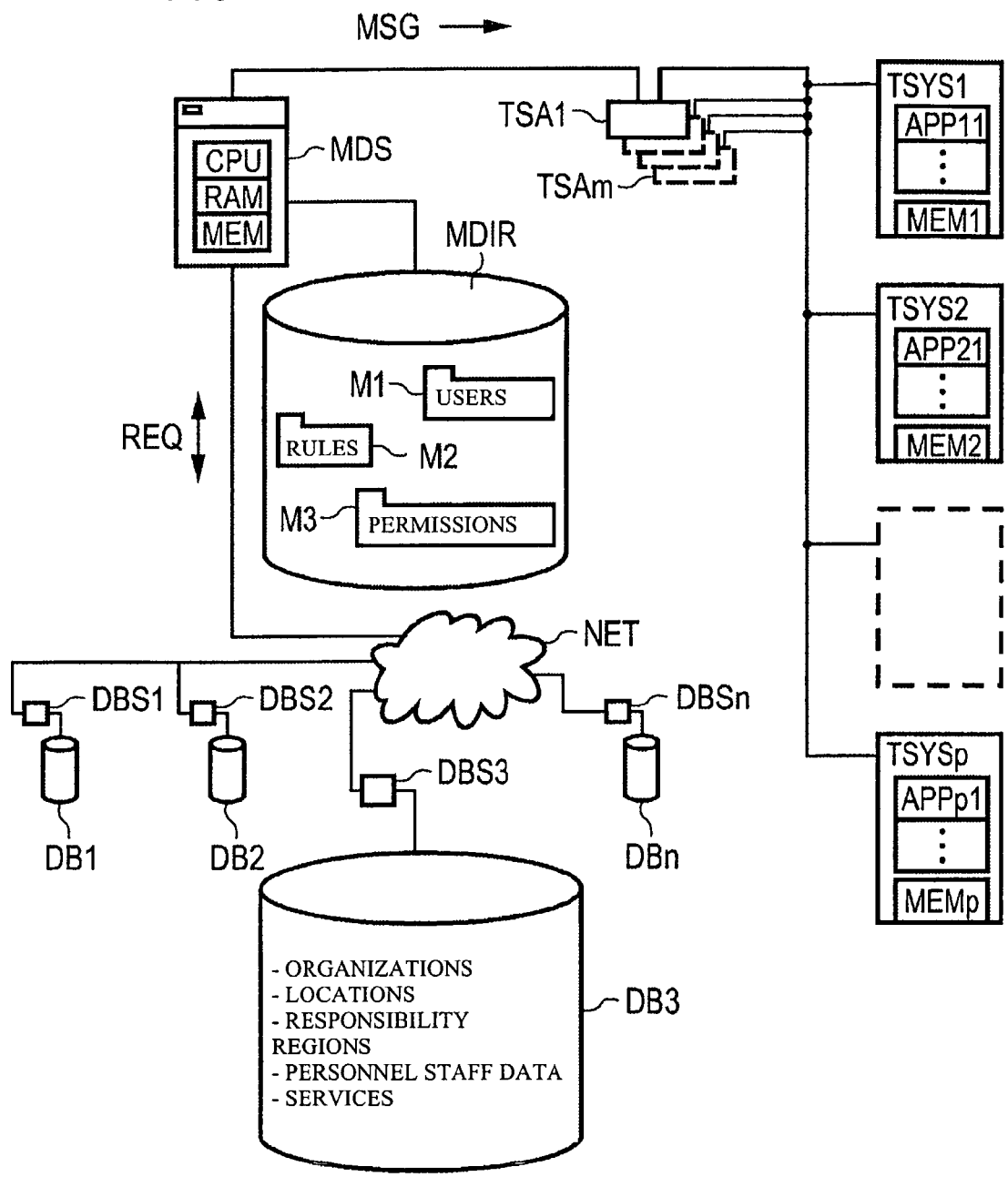
FIG. 2 shows a data processing system with plural data processing devices and role-based resource access control.

The data processing system shown in FIG. 2 has numerous databases DB1-DBn with user-specific data such as organization, location, responsibility region, personnel staff data, and available services. The user-specific data are not necessarily stored in the individual databases according to a unified data structure. The individual databases are linked together for forming a single resulting user database MDIR, hereinafter termed meta-catalog. For linking, the data stored in the individual databases DB1-DBn are converted according to an overall data model. Any data redundancies in the individual databases DB1-DBn are eliminated during data migration into the meta-catalog MDIR. With a change in the user-specific data in the individual databases DB1-DBn, or in the meta-catalog MDIR, a synchronization takes place between the individual databases DB1-DBn and the meta-catalog MDIR. For synchronization of the meta-catalog MDIR with the individual databases DB1-DBn, synchronization requests REQ are exchanged between a server MDS, hereinafter termed meta-catalog server, allocated to the meta-catalog MDIR, and database servers DBS1-DBSn which are allocated to the individual databases DB1-DBn. The synchronization requests REQ are here transmitted over a data network NET which connects the database servers DBS1-DBSn with the meta-catalog server MDS.

The meta-catalog MDIR has memory regions M1-M3 with user staff data, role definitions, and access permissions for resources. Application programs APP1-APPn and memory regions MEM1-MEMp, which are provided by data processing devices TSYS1-TSYSp, belong to the resources. The data processing devices TSYS1-TSYSp providing the resources are termed "target systems" hereinafter.

The access permissions for the resources provided by the target systems TSYS1-TSYSp are awarded by the predefined user roles memorized in the meta-catalog MDIR. The predefined user roles are here allocated to access permissions, and the access permissions to resources of the target systems TSYS1-TSYSp. Allocations of users to roles are furthermore memorized in the meta-catalog MDIR, so that the access permissions allocated to the respective roles are granted to the respective users. The allocations of users to roles are memorized in the meta-catalog MDIR, for example as a portion of the personnel staff data. The predefined user roles are preferably made available for allocation by a role catalog memorized in the meta-catalog MDIR.

The meta-catalog server MDS is connected to the target systems TSYS1-TSYSp via interface devices TSA1-TSAm. The interface devices TSA1-TSAm are termed "target system agents" hereinafter. The target system agents resolve user roles allocated to users of the data processing system into application specific or operating system specific access permissions for application programs APP11-APPpn and memory regions MEM1-MEMp which are provided by the target systems TSYS1-TSYSp. Coordinating functions in regard to program access control and data holding are thus attributed to the target system agents TSA1-TSAm. For coupling the meta-catalog server MDS to the program access control and the data holding of the target systems TSYS1-TSYSp, the target system agents TSA1-TSAm have LDAP (Lightweight Directory Access Protocol) converters and API (Application Programming Interface) access interfaces, not explicitly shown in FIG. 2, and resolve the user roles into instruction sequences which can be interpreted by the respective target systems TSYS1-TSYSp.

With a change of role-defined user-specific data in the meta-catalog MDIR, a message MSG is sent to the respective target system agents TSA1-TSAm. The respective target system agent TSA1-TSAm thereupon inspects the message MSG for a change of application specific or operating system specific access permissions which are to be signaled to the respective target systems TSYS1-TSYSp.

The resource access control method described hereinabove is implemented by a computer program which can be loaded into a working memory RAM of the meta-catalog server MDS and has software code sections whose execution initiates the process described hereinabove. The meta-catalog server MDS has a non-volatile memory medium MEM for permanent memorization of the computer program and a central processor unit CPU for its execution.

Figure 3:
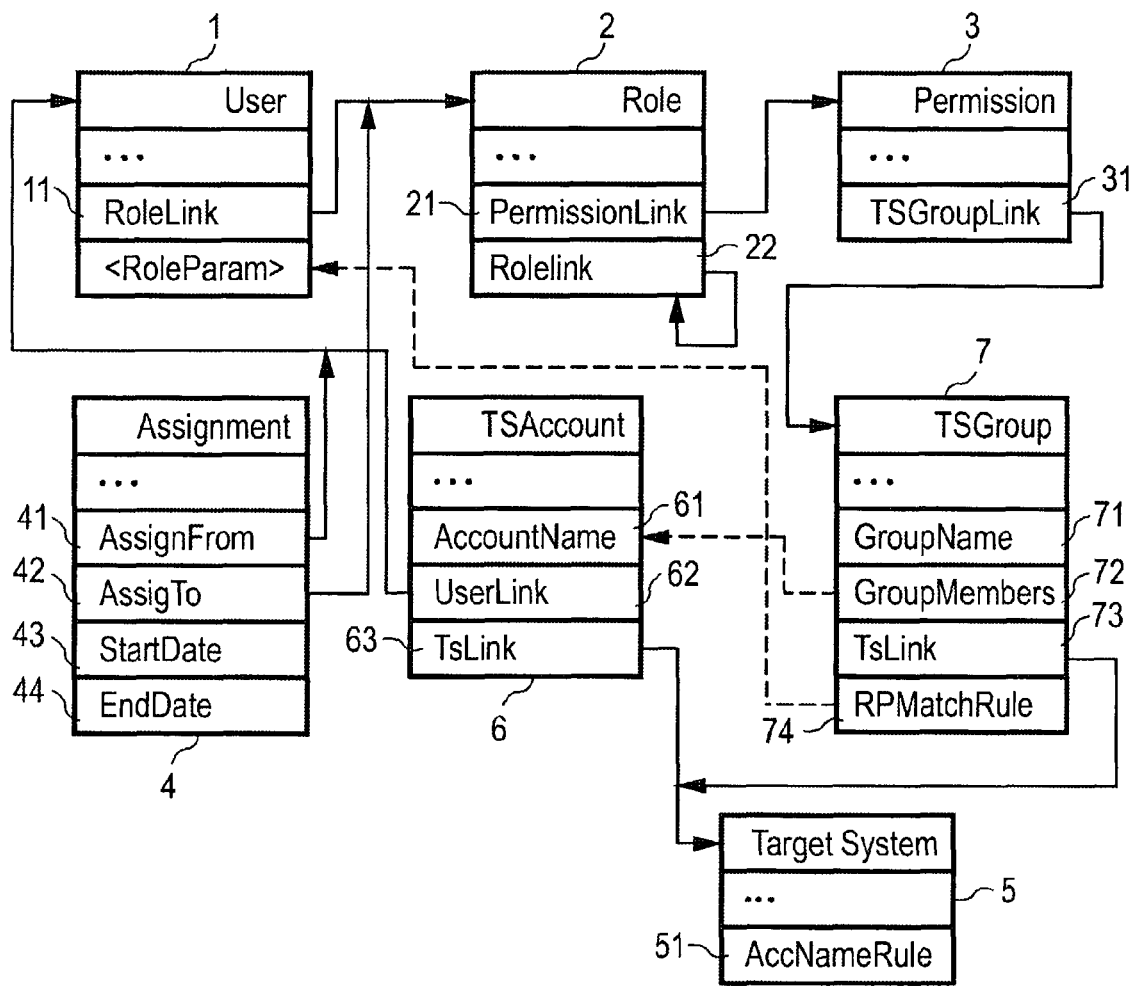
FIG. 3 shows a data model for a role-based resource access control system.

The conversion by data processing technology of a role-based access control information model into a meta-catalog is explained using the data model shown in FIG. 3. The following considerations hold without limitation of generality, particularly for an access control information model corresponding to the standard of the NIST (National Institute of Standards and Technology). and a LDAP meta-catalog. The NIST standard access control information model is termed hereinafter the RBAC (role based access control) information model.

The following object classes are defined in the LDAP meta-catalog for the conversion of the RBAC information model:

object class "User" 1 with user-specific attributes such as given name, last name, telephone number, etc.,
object class "Role" 2 with role-specific attributes, such as description, role identifier, role class, etc.,
object class "Permission" 3 with permission-specific attributes such as description of the permissions and permission identifier.

Access permissions spreading over the target system are brought together in an object of the object class "Permission" 3.

For allocations between object instances, the following attributes describing the allocations are introduced:
Attribute "RoleLink" 11 of the object class "User" 1 for the allocation of a user to one or more roles,
Attribute "PermissionLink" 21 of the object class "Role" 2 for the allocation of a role to one or more permissions.

The attribute "RoleLink" 11 represents an object reference (Distinguished Name Reference) in an LDAP meta-catalog. Since attributes in a LDAP meta-catalog can be multivalued, the m:n relationships between users, roles and permissions can be converted in the sense of the RDAC information model with the three object classes "User" 1, "Role" 2 and "Permission" 3 in a simple fashion.

For the support of role hierarchies, the object class "Role" 2 likewise contains an attribute "RoleLink" 22. Hierarchies of role instances can be generated therewith. For example, a role object "Group Manager" can refer via the attribute "RoleLink" 22 to a role object "employee" and thereby inherit the permissions allocated to the role object "employee" in the sense of the RBAC information model.

For a specification of a time binding between users and roles, an object class "Assignment" 4 is introduced. Allocations between users and roles, and also a beginning and an end of the respective allocation, are both given with the object class "Assignment" 4. For this purpose, the object class "Assignment" 4 contains the following attributes:
"AssignFrom" 41 for an object reference to an instance of the object class "User" 1,
"AssignTo" 42 for an object reference to an instance of the object class "Role" 2,
"StartDate" 43 for a starting time point of the allocation,
"EndDate" 44 for an end time point of the allocation.

In order to support an automatic administration of user identifiers and user groups and an allocation of user identifiers to user groups by an LDAP meta-catalog, the following object classes are used:
"TargetSystem" 5 for administration of a specific target system,
"TSAccount" 6 for imaging a user identifier of a specific target system,
"TSGroup" 7 for imaging a user group of a specific target system.

The object class "TargetSystem" contains among other things an attribute "AccNameRule" 51 for a rule for the formation of user identifier names. This serves as an automatic facility for user identifiers in the respective target system.

The object class "TSAccount" 6 contains among other things the following attributes:
"AccountName" 61 for a name of a user identifier,
"TSLink" 62 for a reference to a target system for which the user identifier is arranged,
"UserLink" 63 for a reference to a user to whom the user identifier is allocated.

The object class "TSGroup" 7 contains among other things the following attributes:
"GroupName" 71 for a name of a user group identifier,
"GroupMembers" 72 for a reference to names of user identifiers which are allocated to a user group,
"TSLink" 73 for a reference to a target system for which the user group is arranged.

For a connection of an award of access permissions by the RBAC information model and an automatic administration of user identifiers, user groups and of an allocation of user identifiers to user groups in an LDAP meta-catalog, the object class "Permission" 3 is extended by an attribute "TSGroupLinK" 31. The attribute "TSGroupLink" 31 serves as an allocation of permissions spreading over target systems to user groups in specific target systems, therefore target system specific permissions.

For the support of role parameters, the object class "TSGroup" is extended by the attribute "RPMatchRule" 74. The attribute "RPMatchRule" 74 serves for the establishment of a selection rule for the consideration of a user group when awarding a permission for a user to whom specific role parameter values are allocated.

With the described data model, the conversion by data processing technology of a role-based access control information model into a meta-catalog takes place in the fashion described hereinbelow:

A user is first imaged in an instance of the object class "User" 1. An allocation of roles without time binding takes place by the attribute "RoleLink" 11. An allocation of roles with time binding takes place rolewise by a respective instance of the object class "Assignment" 4. There the allocation is set up by the attributes "AssignFrom" 41 and "AssignTo" 42 and by the attributes "StartDate" 43 and "EndDate" 44.

A role is imaged in an instance of the object class "Role" 2. A construction of role hierarchies takes place by the attribute "RoleLink" 22. An allocation of roles to permissions takes place by the attribute "PermissionLink" 21.

A permission which spreads over target systems is imaged in an instance of the object class "Permission" 3. An allocation of permissions to user groups as target system specific permissions takes place by the attribute "TSGroupLink" 31.

A target system which is administered by the resource access control is imaged in an instance of the object class "TargetSystem" 5. A selection rule is laid down there for the formation of user identifier names. A target system specific user group is imaged in an instance of the object class "TSGroup".

By a search according to the name of an instance of the object class "User" 1 over all instances of the object class "TSAccount" 6, it is determined in which target systems user identifiers already exist for a user. Furthermore, which roles are allocated to a user can be determined for each point in time. For this purpose, references in the attribute "RoleLink" 11 of the object class "User" 1 are evaluated. Role allocations without time binding result from this. Role allocations with time binding are determined by an evaluation of the attributes "AssignFrom" 41 and "AssignTo" 42 of instances of the object class "Assignment" 4.

At each point in time, starting from a user, via the roles allocated to the user and the target system specific access permissions allocate to the roles, it can be determined to which user groups a user is to be allocated. A corresponding allocation takes place by a user identifier which is specific for the respective target system. By the described determination of already existing user identifiers, whether a usable user identifier is already arranged for the respective user in a given target system can be inspected. If no user identifier is yet arranged, a new user identifier can be arranged for use. The name of a new user identifier is formed using the attribute "AccNamerRule" 51 of the object class "TargetSystem" 5.

If user groups are determined which depend on role parameters due to a selection rule set up by the attribute "RPMatchRule" 74 of the object class "TSGroup" 7, the corresponding selection rule is applied to the user role parameter values of the respective user. A classification of a user in a user group is only performed when the selection rule for the user role parameter values of the user gives a positive result.

At each point in time, to which user groups a user is allocated can be determined. For this purpose, the user identifiers of the respective user are determined. By a search, the user groups in which the respective user identifier is allocated are determined for each of these user identifiers.

The data processing technological conversion described here of a role-based access control information model into a meta-catalog offers the advantage of a simple traceability and visibility. Moreover, a further advantage relates to allocations and relationships of the individual object classes being stored free from redundancy. The allocations can therefore be determined either directly, by object references, or indirectly, by search requests. Furthermore the allocation of users to roles is optimized as regards memory utilization and access time because of the direct object reference in the object class "User" 1. In addition, a role allocation without time binding occurs more frequently in practice than a role allocation with time binding.

Furthermore, the use is made possible of meta-catalogs for the automatic administration of user identifiers and user groups in specific target systems based on the modeling of the user identifiers and user groups into their own object classes and based on the assessment of the permission award by an allocation of the user identifiers to user groups.

The application of the present invention is not limited to the embodiment example described herein.

The invention has been described in detail with particular reference to preferred embodiments thereof and examples, but it will be understood that variations and modifications can be effected within the spirit and scope of the invention.

What is claimed is:

1. A method for controlling access to resources of a data processing system with at least one data processing device, comprising:
   linking together a plurality of databases having user-specific data and being allocated to the data processing system to form a single resulting metadirectory database;
   eliminating redundant user-specific data among the plurality of databases during the linking together;
   predefining user roles using memberships of users in organization units or regions of responsibility of the users for business processes;
   awarding access permissions for resources provided by the at least one data processing device by the predefined user roles stored in the single resulting metadirectory database; and
   allocating at least one user role to at least one user of the data processing system according to at least one of the predefined user roles.

2. The method of claim 1, further comprising:
   determining responsibility regions of users in business processes by the predefined user roles; and
   allocating at least one user role to at least one user of the data processing system according to at least one of the responsibility regions.

3. The method of claim 2, wherein the user-specific data includes the at least one user role allocated to the at least one user.

4. The method of claim 3, further comprising:
   making the predefined user roles available for allocation by a role catalog.

5. The method of claim 4, further comprising:
   using an interface provided at the data processing device, converting each user role into a plurality of access permissions; and providing access to designated memory regions of the data processing device to the user allocated to the user role.

6. The method of claim 5, further comprising:
resolving the at least one user role allocated to the at least one user by an interface device allocated to one of the data processing devices into application-specific access permissions for a program application provided by the data processing device.

7. The method of claim 6, further comprising:
when a change of role-defined user-specific data in the metadirectory database occurs, sending a message comprising the changed role-defined user-specific data to the interface device and inspecting for a change of application-specific or operating system-specific access permissions.

8. The method of claim 1, wherein the user-specific data includes the at least one user role allocated to the at least one user.

9. The method of claim 1, further comprising:
making the predefined user roles available for allocation by a role catalog.

10. The method of claim 1, further comprising:
using an interface provided at the data processing device, converting each user role into a plurality of access permissions; and
providing access to designated memory regions of the data processing device to the user allocated to the user role.

11. The method of claim 1, further comprising:
resolving the at least one user role allocated to the at least one user by an interface device allocated to one of the data processing devices into application-specific access permissions for a program application provided by the data processing device.

12. The method of claim 11, further comprising:
when a change of role-defined user-specific data in the metadirectory database occurs, sending a message comprising the changed role-defined user-specific data to the interface device and inspecting for a change of application-specific or operating system-specific access permissions.

13. A data processing system, comprising:
at least one data processing device;
a plurality of databases, in which user-specific data is stored, each of the plurality being linked together to form a single resulting metadirectory database;
an award unit to award, by predefined user roles stored in the single resulting metadirectory database, access permissions for resources provided by the at least one data processing device; and
an allocation unit to allocate at least one user role to at least one user of the data processing system according to at least one of the predefined user roles;
wherein redundant user-specific data among the plurality of databases are eliminated when they are linked together; and
wherein the user roles are predefined using memberships of users in organization units or regions of responsibility of the users for business processes.

14. A machine-readable storage medium that stores instructions executable by a machine to perform operations comprising:
linking together a plurality of databases having user-specific data and being allocated to a data processing system to form a single resulting metadirectory database;
eliminating redundant user-specific data among the plurality of databases during the linking together;
predefining user roles using memberships of users in organization units or regions of responsibility of the users for business processes;
awarding access permissions for resources provided by the at least one data processing device by the predefined user roles stored in the single resulting metadirectory database; and
allocating at least one user role to at least one user of the data processing system according to at least one of the predefined user roles.

15. A method for controlling access to resources of at least one data processing device, comprising:
linking together a plurality of databases containing user-specific data for users of the data processing device, to thereby form a metadirectory database;
eliminating redundant user-specific data among the plurality of databases during the linking together;
predefining user roles using memberships of users in organization units or regions of responsibility of the users for business processes;
allocating a user role to each user of the data processing device, based on the user-specific data for the user according to at least one predefined user role; and
selecting access permissions to the resources of the data processing device to award using user roles stored in the single resulting metadirectory database, each user role encompassing a plurality of access permissions.

* * * * *